US010465798B2

(12) United States Patent
Saso et al.

(10) Patent No.: US 10,465,798 B2
(45) Date of Patent: Nov. 5, 2019

(54) GASKET AND METHOD OF MANUFACTURING THE SAME

(71) Applicant: NOK CORPORATION, Tokyo (JP)

(72) Inventors: Hidetoshi Saso, Fujisawa (JP); Yoshihiro Kurano, Kikugawa (JP); Takayuki Horimoto, Fujisawa (JP); Tetsuya Urakawa, Fujisawa (JP); Kenichi Oba, Fujisawa (JP); Takuro Nishimura, Fujisawa (JP); Hajime Yui, Fujisawa (JP)

(73) Assignee: NOK Corporation (JP)

( * ) Notice: Subject to any disclaimer, the term of this patent is extended or adjusted under 35 U.S.C. 154(b) by 17 days.

(21) Appl. No.: 15/578,619

(22) PCT Filed: May 12, 2016

(86) PCT No.: PCT/JP2016/064078
§ 371 (c)(1),
(2) Date: Nov. 30, 2017

(87) PCT Pub. No.: WO2016/194573
PCT Pub. Date: Dec. 8, 2016

(65) Prior Publication Data
US 2018/0163870 A1  Jun. 14, 2018

(30) Foreign Application Priority Data
Jun. 4, 2015  (JP) .................. 2015-113596

(51) Int. Cl.
*F16J 15/10* (2006.01)
*H01M 8/0271* (2016.01)
(Continued)

(52) U.S. Cl.
CPC ........... *F16J 15/102* (2013.01); *B29C 44/586* (2013.01); *B29C 45/1418* (2013.01);
(Continued)

(58) Field of Classification Search
CPC ............. B29C 45/14; B29C 45/14754; B29C 45/1418; B29C 45/14336;
(Continued)

(56) References Cited

U.S. PATENT DOCUMENTS

| 4,748,092 A | 5/1988 | Hekal |
| 2004/0075224 A1 | 4/2004 | Kuroki et al. |
| 2006/0269818 A1 | 11/2006 | Inoue et al. |

FOREIGN PATENT DOCUMENTS

| CN | 1496458 A | 5/2004 |
| CN | 1802763 A | 7/2006 |

(Continued)

OTHER PUBLICATIONS

Extended European Search Report for Patent Application No. EP 16803010.4 dated Jun. 11, 2018 (5 pages).

(Continued)

*Primary Examiner* — Gilbert Y Lee
(74) *Attorney, Agent, or Firm* — Harness, Dickey & Pierce, P.L.C.

(57) ABSTRACT

The invention provides a gasket which improves a handling workability of a rubber only type gasket. The gasket of the invention is constructed by a combination of a rubber only type gasket main body, and a carrier sheet which is made of a resin film retaining the gasket main body in a non-bonded state, and the carrier sheet is provided with an air inflow port for making air flow into a portion between the carrier sheet and the gasket main body when the gasket main body is detached from the carrier sheet. A gasket retention portion having a three-dimensional shape which is deformed along an outer shape of the gasket main body is arranged at a position which laps over the gasket main body in a plane in (Continued)

the carrier sheet, and the gasket main body is partly accommodated within the gasket retention portion in a thickness direction.

11 Claims, 7 Drawing Sheets

(51) Int. Cl.
   *B29C 44/58*   (2006.01)
   *B29C 45/14*   (2006.01)
   *B29C 45/26*   (2006.01)
   *B29L 31/26*   (2006.01)

(52) U.S. Cl.
   CPC .... *B29C 45/14754* (2013.01); *B29C 45/2608* (2013.01); *F16J 15/104* (2013.01); *F16J 15/106* (2013.01); *F16J 15/108* (2013.01); *H01M 8/0271* (2013.01); *B29C 2045/1477* (2013.01); *B29C 2045/14213* (2013.01); *B29C 2045/14459* (2013.01); *B29L 2031/26* (2013.01)

(58) Field of Classification Search
   CPC .... B29C 2045/1477; B29C 2045/14459; F16J 15/106; F16J 15/10; F16J 15/108; F16J 15/061; H01M 8/0286; H01M 8/0273; H01M 8/0276; H01M 8/0278; H01M 8/0284; H01M 2008/1095; B32B 2307/51; B32B 2581/00; B29K 2995/0094
   See application file for complete search history.

(56) References Cited

FOREIGN PATENT DOCUMENTS

| | | |
|---|---|---|
| CN | 2879433 Y | 3/2007 |
| EP | 1367301 A1 | 12/2003 |
| JP | S54-159552 A | 12/1979 |
| JP | S55-144134 A | 11/1980 |
| JP | 2005-003181 A | 1/2005 |
| JP | 2005098476 A * | 4/2005 ........... F16J 15/0806 |
| JP | 2014-060133 A | 4/2014 |

OTHER PUBLICATIONS

International Search Report (in English and Japanese) issued in PCT/JP2016/064078, dated Jun. 21, 2016; ISA/JP.

* cited by examiner

GASKET AND METHOD OF MANUFACTURING THE SAME

CROSS-REFERENCE TO RELATED APPLICATIONS

This application is a U.S. National Stage Application of International Application No. PCT/JP2016/064078, filed on May 12, 2016, and published in Japanese as WO 2016/194573 A1 on Dec. 8, 2016 and claims priority to Japanese Patent Applications No. 2015-113596, filed on Jun. 4, 2015. The entire disclosures of the above applications are incorporated herein by reference.

BACKGROUND OF THE INVENTION

Field of the Invention

The present invention relates to a gasket according to a seal technique, and a method of manufacturing the same. The gasket according to the present invention is used, for example, as a gasket for a fuel battery, or a general gasket for the other intended use.

Description of the Conventional Art

The gasket for the fuel battery includes various gaskets having various structures such as a rubber only type gasket which is constructed by a gasket single part made of a rubber-like elastic material (a rubber), a separator integrated gasket which is obtained by integrally molding the gasket made of the rubber-like elastic material in a separator, and a GDL integrated gasket which is obtained by integrally molding the gasket made of the rubber-like elastic material in a gas diffusion layer (GDL).

These gaskets have respective characteristics. However, since request for cost reduction is severe in recent years, a rubber only type gasket which can satisfy the request is going to be paid attention.

The rubber only type gasket is structured, for example, as shown in FIGS. 7A and 7B.

More specifically, a gasket 11 is formed into a flat surface shape (a flat plate shape) as a whole, and an outer peripheral seal portion 12 for sealing a periphery of a reaction surface of a fuel battery over all the periphery is provided like a frame shape. Further, since it is necessary to partition the reaction surface of the fuel battery and each of manifold portions, an inside seal portion 13 is integrally formed in an inner side of the outer peripheral seal portion 12. A cross sectional shape of the gasket 11 is formed into a circular cross section as shown in FIG. 7B.

However, in the gasket 11 for the fuel battery, there is room for further improvement in the following point.

More specifically, the gasket 11 for the fuel battery is set to a size, for example, about 400 mm×300 mm in an outer shape, and a cross sectional shape (a wire diameter) thereof is on the contrary set to be small (for example, the wire diameter of about 1 mm. Therefore, twist tends to be generated in the gasket 11 single part when being carried or when being stacked, and a handling workability (a handling performance) thereof is not good.

The present invention is made by taking the above point into consideration, and an object of the present invention is to improve a handling workability of a rubber only type gasket.

SUMMARY OF THE INVENTION

In order to achieve the object mentioned above, a gasket according to the present invention is characterized in that the gasket is constructed by a combination of a rubber only type gasket main body, and a carrier sheet which is made of a resin film retaining the gasket main body in a non-bonded state, and the carrier sheet is provided with an air inflow port for making air flow into a portion between the carrier sheet and the gasket main body when the gasket main body is detached from the carrier sheet.

In the present invention, the handling workability of the gasket is improved by retaining the rubber only type gasket main body by the carrier sheet which is made of the resin film. Since the gasket main body is not bonded to the carrier sheet, the gasket main body can be detached from the carrier sheet when being stacked. In the case that the gasket main body is detached from the carrier sheet, the gasket main body can be easily detached (peeled) from the carrier sheet by flowing the air into the portion between the carrier sheet and the gasket main body from the air inflow port which is provided in the carrier sheet.

Since the gasket main body is formed into the flat surface shape (the flat plate shape) and the carrier sheet made of the resin film is also formed into the flat surface shape (the flat plate shape), there is fear that the gasket main body can not be firmly retained by the carrier sheet only putting the gasket main body on the carrier sheet. Therefore, in order to devise a countermeasure, it is preferable that a gasket retention portion having a shape which is deformed along an outer shape of the gasket main body is provided at a position which laps over the gasket main body in a plane in the carrier sheet, and the gasket main body is partly accommodated within the gasket retention portion. According to the structure, since the gasket main body is positioned in the plane in relation to the carrier sheet, the gasket main body can be firmly retained by the carrier sheet. At this time, the air inflow port is provided at a bottom surface position of the gasket retention portion.

Further, in the case that the gasket main body has a protruding portion in its side surface, the air inflow port may be provided at a position which laps over the protruding portion in a plane in the carrier sheet.

The gasket according to the present invention is used, for example, as the gasket for the fuel battery. Since the number of stack lamination is larger in the fuel battery, a small thickness is required in the gasket. Since the gasket having the small thickness tends to be twisted, the handling workability is not good. Therefore, it is extremely effective for achieving efficiency of a stacking work to improve the handling workability by combining the gasket main body with the carrier sheet which is made of the resin film, in a field of the gasket for the fuel battery which tends to be twisted due to the small thickness as mentioned above.

A method of manufacturing a gasket sequentially executes a step of mold clamping a metal mold in a state in which a carrier sheet having a flat surface shape is sandwiched in parting portions of the metal mold forming a gasket main body, a step of forming the gasket main body by the metal mold, and forming a gasket retention portion having a three-dimensional shape by deforming a part in a plane of the carrier sheet along an inner surface of a metal mold cavity with a forming material filling pressure at this time, and a step of opening the mold after the formation of the gasket main body, and thereafter taking out the gasket main body and the carrier sheet simultaneously from the metal mold. The carrier sheet is initially formed into the flat surface shape, however, is partly formed into a three-dimensional shape by utilizing the forming material filling pressure and is fitted to the gasket main body at the position which is formed into the three-dimensional shape. Therefore, the carrier film is high in a retention force. Further, the air inflow port is formed by forming a hollow projection portion at a part in a plane of the carrier sheet in the step of forming the gasket main body with the metal mold among the above steps, and cutting the projection portion in the later step. The method of forming the air inflow port may employ a method of previously forming a hole in the carrier sheet and the previously provided hole may be utilized as the air inflow port.

Effect of the Invention

According to the present invention, since the rubber only type gasket main body is combined with the carrier sheet which is made of the resin film, it is possible to improve the handling workability of the rubber only type gasket. Further, since the air inflow port is provided in the carrier sheet, the gasket main body can be easily detached from the carrier sheet.

BRIEF EXPLANATION OF THE DRAWINGS

FIGS. 1A and 1B are views showing a gasket according to an embodiment of the present invention, in which FIG. 1A is a plan view and FIG. 1B is an enlarged cross sectional view along a line C-C in FIG. 1A;

FIGS. 7A and 7B are views showing a gasket according to the conventional example, in which FIG. 7A is a plan view of the same and FIG. 7B is an enlarged cross sectional view along a line B-B in FIG. 7A.

DETAILED DESCRIPTION OF PREFERRED EMBODIMENTS

The following embodiments are included in the present invention.

(1) The present invention relates to a gasket with a carrier sheet (a film carrier).

(2) A gasket with a carrier sheet in which a film for a carrier is simultaneously formed when a rubber only gasket is manufactured. The present gasket is structured such that the carrier film can be detached at a time of stacking.

(3) A stack assembling property is improved by the carrier film. The carrier film at the center of the gasket or in an end portion thereof is used for an automatic carrier when being assembled by stacking. Since the gasket is corrected by the carrier film, there is no problem in twist. Since the carrier film can be detached at a time of stacking, reduction of a vehicle weight is caused.

(4) A hole for peeling is provided in the gasket with the carrier sheet.

(5) The hole for peeling partly has a hole in the film, and the gasket is peeled off from the film by injecting the air into the hole.

(6) The hole is made a size, for example, φ3 mm, and a plurality of holes are provided at intervals of 5 cm.

(7) As a method of manufacturing the hole, there are a method of manufacturing the hole by deforming the film into a projection shape and cutting the portion, and a method of previously forming a hole in the film.

Embodiment

Next, a description will be given of an embodiment according to the present invention with reference to the accompanying drawings.

Figure 1A:
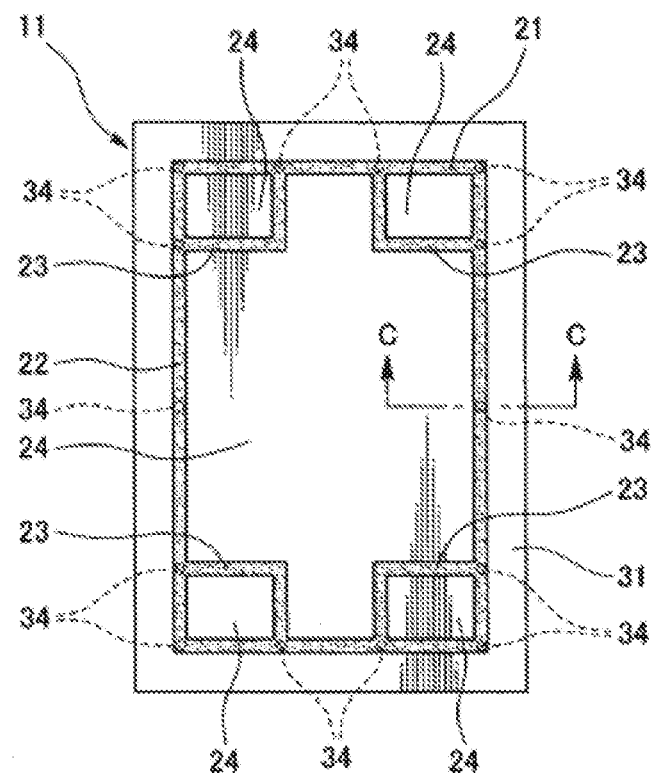

As shown in FIG. 1A, a gasket 11 according to the embodiment is constructed by a combination of a rubber only type gasket main body 21, and a carrier sheet (a film carrier) 31 which is made of a resin film retaining the gasket main body 21 in a non-bonded state. The gasket main body 21 is used as a gasket for a fuel battery.

Figure 1B:
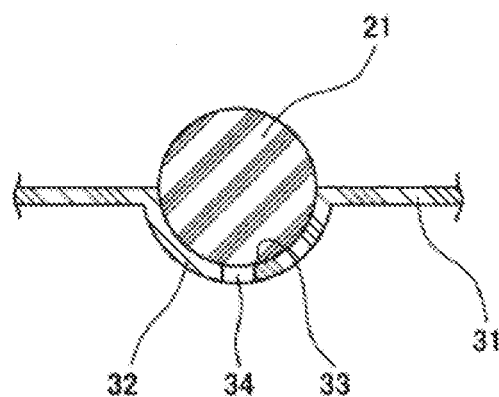

The gasket main body 21 is formed into a flat surface shape (a flat plate shape) by a predetermined rubber-like elastic material (for example, VMQ, PIB, EPDM and FKM), and integrally has an outer peripheral seal portion 22 which is provided for sealing around a reaction surface of a fuel battery over all the periphery and has a frame shape, and an inside seal portion 23 which is provided for sealing a partition portion between the reaction surface of the fuel battery and each of manifold portions, as constructing elements thereof. A cross sectional shape of the gasket main body 21 is formed into, for example, a circular cross section as shown in FIG. 1B. Reference numeral 24 denotes a penetration portion (a space portion) which passes through the gasket main body 21 in its thickness direction. The gasket main body 21 is formed into a rectangular flat surface shape, is set its planar size to have an outer shape with about 400 mm (vertical)×about 300 mm (horizontal), and is set its thickness, that is, its wire diameter to be approximately 1 mm.

The carrier sheet 31 is formed into a flat surface shape (a flat plate shape) by a predetermined resin film, and is formed into a rectangular flat surface which is one size larger than the gasket main body 21. The resin film employs, for example, a polypropylene film having a thickness of 0.2 mm, and is used by cutting the polypropylene film into a flat surface shape having the size mentioned above. General resin materials such as polyethylene and polystyrene can be used in addition to the polypropylene for the resin film. A thickness of the film is preferably set to be between 0.1 mm and 0.3 mm in correspondence to the wire diameter and the cross sectional shape of the gasket main body 21.

A gasket retention portion 32 having a three-dimensional shape is provided at a position which is arranged on a part of the flat surface of the carrier sheet 31 and laps over the gasket main body 21 in a plane, the gasket retention portion 32 being formed into a shape which is deformed along an outer shape of the gasket main body 21 (an outer contour line in the cross sectional shape of the gasket main body 21). A part of the gasket main body 21 in a thickness direction is accommodated in the gasket retention portion 32. Since the cross sectional shape of the gasket main body 21 is formed into the circular cross section as mentioned above in the embodiment, a cross sectional shape of the gasket retention portion is formed into a circular arc cross sectional shape (a semicircular shape) in correspondence thereto. A part in one side in the thickness direction of the gasket main body 21 is accommodated within a space portion 33 (a concave portion) 33 which is provided in a back surface side of the gasket retention portion 32 and is formed into a groove shape, on the basis of the provision of the gasket retention portion 32 having the circular arc cross sectional shape as mentioned above.

Since the gasket main body 21 is not bonded to the carrier sheet 31, the gasket main body 21 can be detached from the carrier sheet 31 when being stacked. In the case that the gasket main body 21 is formed in a state in which the carrier sheet 31 is inserted into a metal mold 41 which forms the gasket main body 21 as mentioned later, the gasket main body 21 is set to a state of being adhered to the carrier film 31 since the formed gasket main body 21 is provided with a adhesion. The adhesion has such a small adhesive force as to be detached by a chucking device. Therefore, in this case, the rubber only type gasket main body 21 is not bonded to the carrier film 31 which is made of the resin film, but is adhered in such a manner as to be capable of being peeled off.

Further, an air inflow port 34 is provided at a position which is a part of the carrier sheet 31 in a plane and laps over the gasket main body 21 in the plane, the air inflow port 34 being provided for flowing air into a portion between the carrier sheet 31 and the gasket main body 21 when the gasket main body 21 is detached from the carrier sheet 31. In the embodiment, the air inflow port 34 is provided at a bottom surface position of the gasket retention portion 32.

Further, a plurality of air inflow ports 34 are provided along a longitudinal direction of the gasket retention portion 32. In the embodiment, as shown by a plan view in FIG. 1A, the air inflow ports 34 are provided at corresponding positions to corner portions (four positions) and center portions (two positions) of longitudinal side edges of the outer peripheral seal portion 22 in the gasket main body 21, and positions (eight positions) where the outer peripheral seal portion 22 and the inside seal portion 23 intersect, that is, totally fourteen positions.

In the gasket 11 having the structure mentioned above, since the rubber only type gasket main body 21 is retained by the carrier sheet 31 which is made of the resin film, the gasket main body 21 is hard to be twisted when the gasket 11 is carried, and the gasket 11 can be easily carried. Further, since the gasket main body 21 is not bonded to the carrier sheet 31, the gasket main body 21 can be easily detached from the carrier sheet 31 when being stacked. Therefore, it is possible to improve a handling workability of the gasket 11.

Further, since the gasket retention portion 32 having the three-dimensional shape is provided in the carrier sheet 31 and a part of the gasket main body 21 is accommodated within the gasket retention portion 32, the gasket main body 21 is positioned on a plane in relation to the carrier sheet 31. Therefore, since the gasket main body 21 is not displaced in relation to the carrier sheet 31 when the gasket 11 is carried, the gasket main body 21 can be firmly retained by the carrier sheet 31.

Further, since the air inflow port 34 is provided in the carrier sheet 31, the gasket main body 21 can be easily detached (peeled) from the carrier sheet 31 by flowing (injecting) the air into the portion between the carrier sheet 31 and the gasket main body 21 from the air inflow port 34 when the gasket main body 21 is easily detached from the carrier sheet 31. Therefore, it is possible to provide a gasket product in which the gasket main body 21 can be easily detached from the carrier sheet while firmly retaining the gasket main body 21 by the carrier sheet 31.

With regard to the cross sectional shape of the gasket main body 21 and the cross sectional shape of the gasket retention portion 32 corresponding thereto, various cross sections can be thought in correspondence to the use conditions of the gasket main body 21, for example, the following cross sectional shapes can be employed.

Figure 2A:
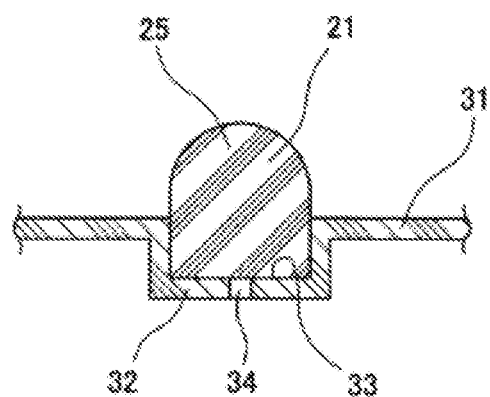
FIGS. 2A and 2B are cross sectional views respectively showing the other examples of a cross sectional shape of the gasket.

In an example of FIG. 2A, a seal lip 25 having a circular arc cross sectional shape (a semicircular shape) is integrally formed in an upper surface of the gasket main body 21 having the rectangular cross sectional shape. In this case, since the lower half position in one side in the thickness direction of the gasket main body 21 is formed into a square cross section shape, the cross sectional shape of the gasket retention portion 32 is also formed into a square cross section shape. Further, the air inflow port 34 is provided in a planar bottom portion of the gasket retention portion 32.

Figure 2B:
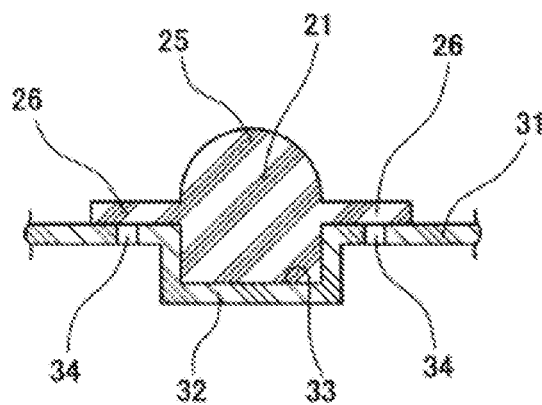

In an example of FIG. 2B, a seal lip 25 having a circular arc cross sectional shape (a semicircular shape) is integrally formed in an upper surface of the gasket main body 21 having the rectangular cross sectional shape, and a protruding portion 26 having a flat surface shape is integrally formed in a side surface portion of the gasket main body 21. In this case, since a position in a lower half section of the one side in the thickness direction of the gasket main body 21 is formed into the rectangular cross sectional shape, the cross sectional shape of the gasket retention portion 32 is also formed into a rectangular cross sectional shape. Further, the air inflow port 34 is provided at a position which laps over the protruding portion 26 on a plane next to the gasket retention portion 32 in the carrier sheet 31.

Next, a description will be given of a method of manufacturing the gasket.

The method of manufacturing the gasket according to the embodiment is provided for manufacturing the gasket 11 shown in FIG. 2A. A metal mold for injection molding the rubber only type gasket main body 21 is used for manufacturing.

Figure 3A:
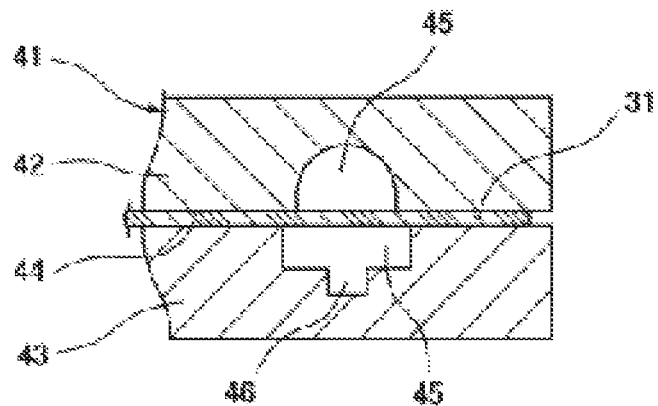
FIGS. 3A, 3B and 3C are process explanatory views 1 of a method of manufacturing the gasket according to an embodiment of the present invention.

In the process, first of all, the carrier sheet 31 having the flat surface shape with a predetermined size is prepared. As shown in FIG. 3A, the metal mold 41 is clamped in a state in which the carrier sheet 31 is sandwiched in parting portions 44 of the metal mold 41.

The metal mold 41 has a combination of an upper mold (one split mold) 42 and a lower mold (the other split mold) 43, and cavity portions 45 are correspondingly provided, for example, half by half in the parting portions 44 of both the molds 42 and 43. Since the carrier sheet 31 is initially formed into the flat surface shape in its whole surface, the carrier sheet 31 is set to a state of cutting across the cavity portion 45. A projection forming portion 46 is provided as a part of the cavity portion 45 in a bottom surface portion of the cavity portion 45 in the lower mold 43, the projection forming portion 46 being provided for forming in the carrier sheet 31 a hollow projection portion 35 which is later formed into the air inflow port 34.

Figure 3B:
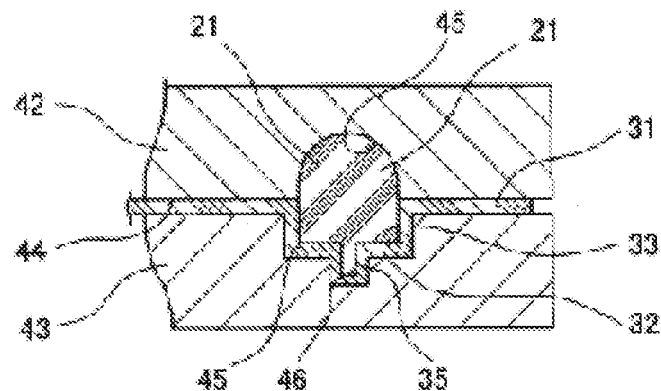

Next, as shown in FIG. 3B, the gasket main body 21 is formed by filling a molding material for forming the gasket main body 21 in the cavity portion 45 and heating the molding material. When the molding material is filled in the cavity portion 45, the carrier sheet 31 is pressed to an inner surface of the cavity portion 45 in its part (a portion within the cavity) of the plane by a forming material filling pressure, and is deformed (plastically deformed) into a shape which is along the inner surface of the cavity portion 45. As a result, the gasket retention portion 32 and the hollow projection portion 35 are formed.

Figure 3C:
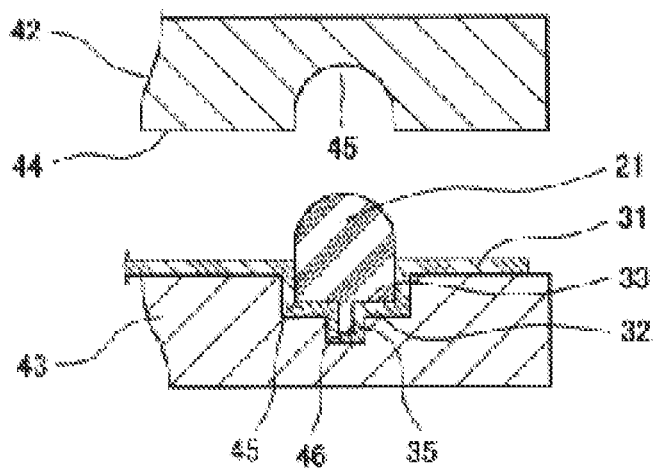
Figure 4A:
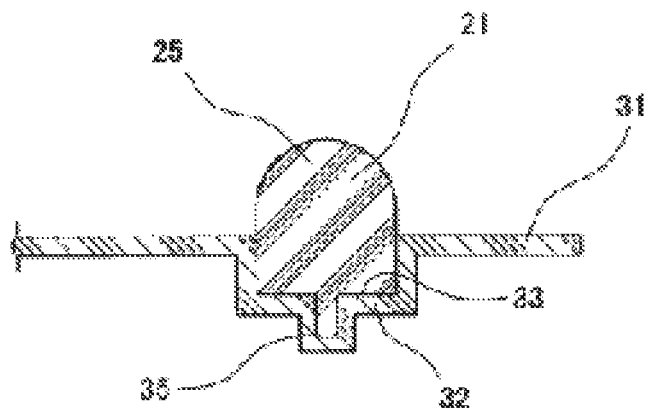
FIGS. 4A and 4B are process explanatory views 2 of the method of manufacturing the gasket according to the embodiment of the present invention.

Next, as shown in FIG. 3C, the mold is opened after the formation of the gasket main body 21, and the gasket main body 21 and the carrier sheet 31 are simultaneously taken out of the metal mold 41 as shown in FIG. 4A. The taken-out gasket main body 21 and carrier sheet 31 are formed into a combination state in which the gasket main body 21 is retained by the carrier sheet 31.

Figure 4B:
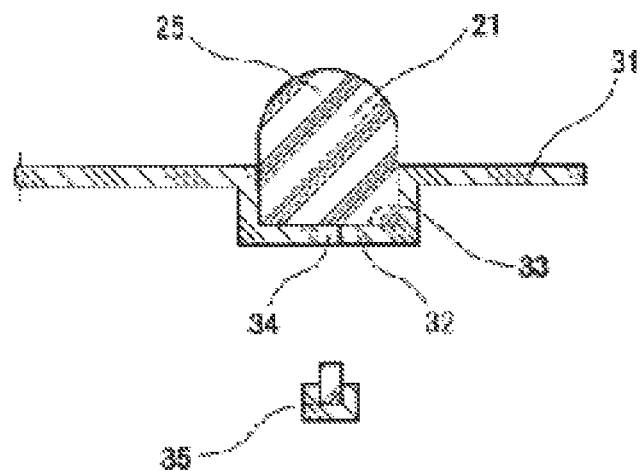

Next, as shown in FIG. 4B, the hollow projection portion 35 is removed (cut) together with the rubber filled in the inner portion thereof from the carrier sheet 31, and the air inflow port 34 is formed accordingly in the carrier sheet 31. The manufacturing of the gasket 11 is finished by the above steps.

The gasket main body 21 and the carrier sheet 31 are carried and stored as a product in a state of being combined with each other. The torsion is hard to be generated in the gasket main body 21 which is retained by the carrier sheet 31. Therefore, the handling workability is improved in comparison with the case that the gasket main body 21 is handled as a single part. Further, since the air inflow port 34 is provided in the carrier sheet 31 as mentioned above, the gasket main body 21 can be easily detached (peeled) from the carrier sheet 31 by flowing (injecting) the air into the portion between the carrier sheet 31 and the gasket main body 21 from the air inflow port 34 when the gasket main body 21 is detached from the carrier sheet 31. As a result, it is possible to provide the gasket product in which the gasket main body 21 can be easily detached from the carrier sheet 31 while firmly retaining the gasket main body 21 by the carrier sheet 31.

Figure 5A:
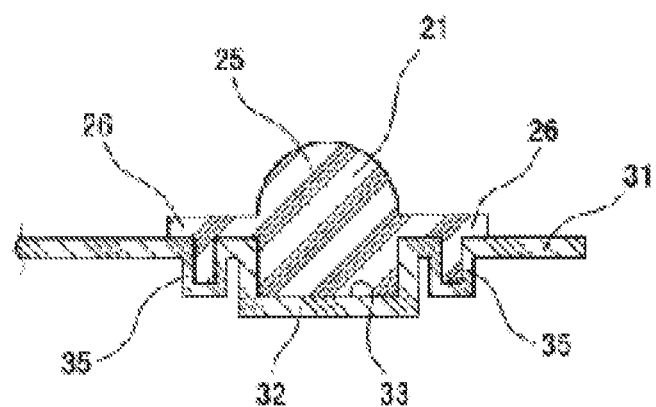
FIGS. 5A and 5B are process explanatory views of a method of manufacturing a gasket according to the other embodiment of the present invention.
Figure 5B:
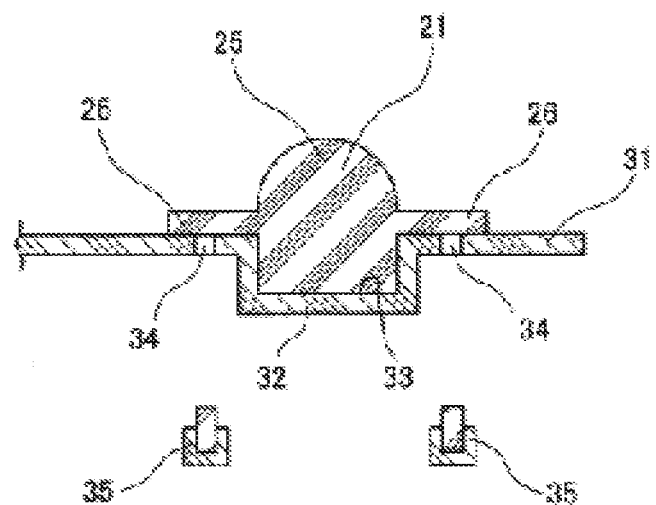

When manufacturing the gasket 11 shown in FIG. 2B mentioned above, the air inflow port 34 is formed by forming the hollow projection portion 35 at the position which laps over the protruding portion 26 on the plane beside the gasket retention portion 32 in the carrier sheet 31 as shown in FIG. 5A in reference to the forming position of the air inflow port 34, and removing (cutting) the projection portion 35 together with the rubber filled into the inner portion thereof in the later step as shown in FIG. 5B.

Figure 6:
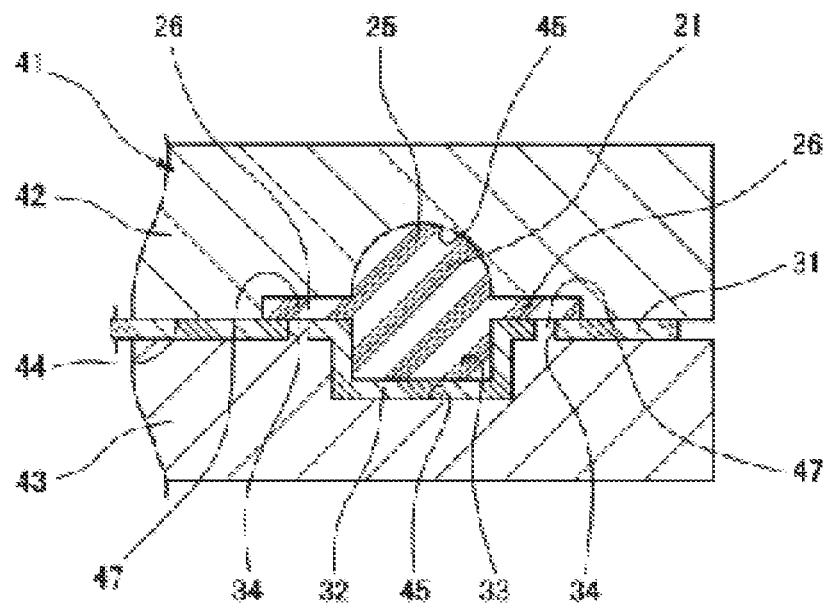
FIG. 6 is a process explanatory view of a method of manufacturing a gasket according to the other embodiment of the present invention.
Figure 7A:
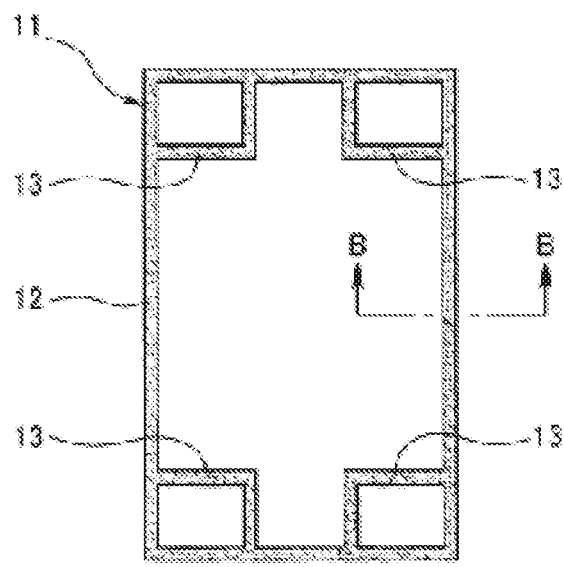
Figure 7B:
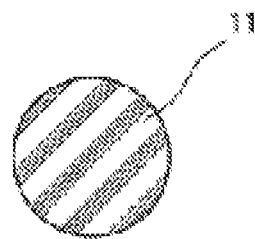

Further, the method of forming the air inflow port 34 may be structured, as shown in FIG. 6, such that the air inflow port 34 is provided previously at a predetermined position of the carrier sheet 31 as shown in FIG. 6. In this case, it is preferable to provide a closing projection 47 engaging with the air inflow port 34 and closing the air inflow port 34 in a parting surface of the metal mold 41 (the lower mold 43) so as to prevent a part of the rubber material (the forming material) from entering into the air inflow port 34 when forming the gasket main body 21.

Further, when the gasket main body 21 is assembled in a fuel battery stack, the gasket main body 21 is gripped and lifted up by a chucking device in a state in which the carrier sheet 31 is adsorbed and fixed to a base side by a vacuuming device, and is moved to a predetermined position. The gasket main body 21 in which the torsion is not generated is easily gripped by the chucking device, and it is possible to smoothly go on the work.

What is claimed is:

1. A gasket comprising:
    a rubber only type gasket main body;
    a carrier sheet which is made of a resin film, the carrier sheet including a gasket retention portion defined a three-dimensional shape that corresponds to a shape of the gasket main body that is configured to retain the gasket main body in a non-bonded state; and
    an air inflow port that permits air to flow between the carrier sheet and the gasket main body when the gasket main body is detached from the gasket retention portion,
    wherein the air inflow port is provided in the gasket retention portion.

2. The gasket according to claim 1,
    wherein the gasket retention portion is arranged at a position which laps over the gasket main body in a plane in the carrier sheet,
    wherein the gasket main body is partly accommodated within the gasket retention portion in a thickness direction, and
    wherein the air inflow port is arranged at a bottom surface position of the gasket retention portion.

3. The gasket according to claim 2, wherein the gasket main body is used as a gasket for a fuel battery which is assembled in a fuel battery stack.

4. The gasket according to claim 1,
    wherein the gasket retention portion is arranged at a position which laps over the gasket main body in a plane in the carrier sheet,
    wherein the gasket main body is partly accommodated within the gasket retention portion in a thickness direction,
    wherein a protruding portion is arranged in a side surface of the gasket main body, and
    wherein the air inflow port is arranged at a position which laps over the protruding portion in a plane in the carrier sheet in a plane.

5. The gasket according to claim 4, wherein the gasket main body is used as a gasket for a fuel battery which is assembled in a fuel battery stack.

6. The gasket according to claim 1, wherein the gasket main body is used as a gasket for a fuel battery which is assembled in a fuel battery stack.

7. A method of manufacturing the gasket according to claim 1, comprising:
    a step of mold clamping a metal mold in a state in which a carrier sheet having a flat surface shape is sandwiched in parting portions of the metal mold forming a gasket main body;
    a step of forming the gasket main body by the metal mold, and forming a gasket retention portion having a three-dimensional shape by deforming a part in a plane of the carrier sheet along an inner surface of a metal mold cavity with a forming material filling pressure at this time;
    a step of opening the mold after the formation of the gasket main body, and thereafter taking out the gasket main body and the carrier sheet simultaneously from the metal mold; and
    a step of forming the air inflow port by forming a hollow projection portion at a part in a plane of the carrier sheet in the step of forming the gasket main body with the metal mold among the steps, and cutting the projection portion in the later step.

8. A method of manufacturing the gasket according to claim 2, comprising:
    a step of mold clamping a metal mold in a state in which a carrier sheet having a flat surface shape is sandwiched in parting portions of the metal mold forming a gasket main body;
    a step of forming the gasket main body by the metal mold, and forming a gasket retention portion having a three-dimensional shape by deforming a part in a plane of the carrier sheet along an inner surface of a metal mold cavity with a forming material filling pressure at this time;

a step of opening the mold after the formation of the gasket main body, and thereafter taking out the gasket main body and the carrier sheet simultaneously from the metal mold; and a step of forming the air inflow port by forming a hollow projection portion at a part in a plane of the carrier sheet in the step of forming the gasket main body with the metal mold among the steps, and cutting the projection portion in the later step.

9. A method of manufacturing the gasket according to claim 4, comprising:

a step of mold clamping a metal mold in a state in which a carrier sheet having a flat surface shape is sandwiched in parting portions of the metal mold forming a gasket main body;

a step of forming the gasket main body by the metal mold, and forming a gasket retention portion having a three-dimensional shape by deforming a part in a plane of the carrier sheet along an inner surface of a metal mold cavity with a forming material filling pressure at this time;

a step of opening the mold after the formation of the gasket main body, and thereafter taking out the gasket main body and the carrier sheet simultaneously from the metal mold; and a step of forming the air inflow port by forming a hollow projection portion at a part in a plane of the carrier sheet in the step of forming the gasket main body with the metal mold among the steps, and cutting the projection portion in the later step.

10. A method of manufacturing the gasket according to claim 6, comprising:

a step of mold clamping a metal mold in a state in which a carrier sheet having a flat surface shape is sandwiched in parting portions of the metal mold forming a gasket main body;

a step of forming the gasket main body by the metal mold, and forming a gasket retention portion having a three-dimensional shape by deforming a part in a plane of the carrier sheet along an inner surface of a metal mold cavity with a forming material filling pressure at this time;

a step of opening the mold after the formation of the gasket main body, and thereafter taking out the gasket main body and the carrier sheet simultaneously from the metal mold; and a step of forming the air inflow port by forming a hollow projection portion at a part in a plane of the carrier sheet in the step of forming the gasket main body with the metal mold among the steps, and cutting the projection portion in the later step.

11. A method of manufacturing the gasket according to claim 3, comprising:

a step of mold clamping a metal mold in a state in which a carrier sheet having a flat surface shape is sandwiched in parting portions of the metal mold forming a gasket main body;

a step of forming the gasket main body by the metal mold, and forming a gasket retention portion having a three-dimensional shape by deforming a part in a plane of the carrier sheet along an inner surface of a metal mold cavity with a forming material filling pressure at this time;

a step of opening the mold after the formation of the gasket main body, and thereafter taking out the gasket main body and the carrier sheet simultaneously from the metal mold; and a step of forming the air inflow port by forming a hollow projection portion at a part in a plane of the carrier sheet in the step of forming the gasket main body with the metal mold among the steps, and cutting the projection portion in the later step.

* * * * *